United States Patent
Rapaka et al.

(10) Patent No.: US 11,327,552 B1
(45) Date of Patent: May 10, 2022

(54) PROCESSOR-BASED SYSTEM EMPLOYING LOCAL DYNAMIC POWER MANAGEMENT BASED ON CONTROLLING PERFORMANCE AND OPERATING POWER CONSUMPTION, AND RELATED METHODS

(71) Applicant: Microsoft Technology Licensing, LLC, Redmond, WA (US)

(72) Inventors: Smitha L. Rapaka, San Jose, CA (US); Patrick Y. Law, Cuppertino, CA (US); Teague C. Mapes, Woodinville, WA (US)

(73) Assignee: Microsoft Licensing Technology, LLC, Redmond, WA (US)

( * ) Notice: Subject to any disclaimer, the term of this patent is extended or adjusted under 35 U.S.C. 154(b) by 0 days.

(21) Appl. No.: 17/178,041

(22) Filed: Feb. 17, 2021

(51) Int. Cl.
*G06F 1/32* (2019.01)
*H02J 13/00* (2006.01)
*G06F 1/3287* (2019.01)
*G06F 1/324* (2019.01)
*G06F 1/04* (2006.01)

(52) U.S. Cl.
CPC .............. *G06F 1/3287* (2013.01); *G06F 1/04* (2013.01); *G06F 1/324* (2013.01); *H02J 13/00002* (2020.01)

(58) Field of Classification Search
CPC ........... G06F 1/3287; G06F 1/324; G06F 1/04
See application file for complete search history.

(56) References Cited

U.S. PATENT DOCUMENTS

| | | | |
|---|---|---|---|
| 2002/0133729 A1* | 9/2002 | Therien ................. | G06F 1/3228 713/330 |
| 2004/0073821 A1* | 4/2004 | Naveh ................... | G06F 1/3203 713/320 |
| 2010/0095137 A1* | 4/2010 | Bieswanger .......... | G06F 1/3296 713/300 |
| 2011/0178652 A1* | 7/2011 | Carter ................... | G06F 1/329 700/296 |
| 2021/0124407 A1* | 4/2021 | Hoppner ............... | G06F 1/3228 |

* cited by examiner

*Primary Examiner* — Stefan Stoynov
(74) *Attorney, Agent, or Firm* — Withrow & Terranova, PLLC

(57) ABSTRACT

Processor-based systems employing local dynamic power management based on controlling performance and operating power consumption, and related methods. The processor-based system is configured to locally manage its power consumption by dynamically adjusting operating frequency and/or operating voltage of power supplied to the processor-based system. The processor-based system includes a power control circuit that is aware of the overall power budget for the processor-based system. The control processor in the processor-based system can dynamically increase the voltage level of the power supplied to the processor-based system and/or the operating frequency if the consumed power is lower than the power budget. The power control circuit can also dynamically decrease the operating frequency and/or the voltage level of the power supplied to the processor-based system if the consumed power is higher than the power budget.

24 Claims, 7 Drawing Sheets

PROCESSOR-BASED SYSTEM EMPLOYING LOCAL DYNAMIC POWER MANAGEMENT BASED ON CONTROLLING PERFORMANCE AND OPERATING POWER CONSUMPTION, AND RELATED METHODS

FIELD OF THE DISCLOSURE

The technology of the disclosure relates to operating power control in a processing unit, such as a central processing unit (CPU), in a processor-based system, including in a system-on-a-chip (SoC).

BACKGROUND

Data centers are integral parts of enterprise systems to support computer business applications and to provide computer-related services. Data centers can provide cloud-based computer services including data storage, data management, and software application hosting. Data centers can also be utilized to perform big data applications such as machine learning and artificial intelligence (AI) applications for example. Data centers include storage systems, computer servers, and related network infrastructure to facilitate communications with computer servers. For example, FIG. 1A illustrates a data center 100 which includes 'M' number of server racks 102(1)-102(M). Each server rack 102(1)-102(M) is configured to house 'N' number of processor-based systems 104(1)(1)-104(M)(N) in this example. Each processor-based system 104(1)(1)-104(M)(N) is provided in the form of a printed circuit board (PCB), also sometimes referred to as a "card" or "blade." FIG. 1B illustrates a server rack 102 in the data center 100 in FIG. 1A. As shown in FIG. 1B, the processor-based systems 104 are supported in respective chassis equipment 106, that may be in the form of an equipment tray, that is installed in a respective slot 108(1)-108(N) of a server rack 102. A processor-based system 104 is communicatively coupled in the data center 100 through a backplane interface connector 110 that is connected to a backplane connector 112 of the processor-based system 104 when the processor-based systems 104 is fully-installed in its respective slot 108(1)-108(N) in the server rack 102.

Data center processor-based systems, such as the processor-based systems 104 in FIGS. 1A and 1B, are provided on a blade or card as an integrated circuit (IC) that includes one or more central processing units (CPUs). For example, the processor-based system can be configured as a computer server, or as a dedicated processor-based system to perform specific applications and tasks depending on the application. The CPU(s) provided in a processor-based system on a blade or card can be a single processor core ("core") CPU or a multi-core CPU. The CPU can be provided in an IC chip that is system-on-a-chip (SoC) which also includes other supporting components on the same semiconductor die and IC chip, such as memory, interface circuits, modems, etc.

As discussed above, data centers can be particularly useful to support large numbers of processor-based systems to support AI applications and workloads. AI workloads are rapidly evolving and using large machine learning training models to solve complex problems. These training models need high performance processor-based systems to be able to train using vast amounts of data over long durations. For processor-based systems to provide such high performance, they need to consume a significant amount of power to operate at higher operating frequencies. The need for CPUs in processor-based systems to operate at higher operating frequencies is a function of the workloads being performed and the desired performance in executing these workloads. However, machine learning training models are in a rapidly evolving stage, and their workload behaviors are not yet fully characterized. This means the processor-based systems executing these workloads need to provide flexible options to optimize performance under different power levels. However, power available to be consumed by processor-based systems in a data center may be limited by the power distribution system capability and distribution in the data center. For example, the data center may be capable of distributing power to each of the processor-based systems therein according to a fixed power budget established for each processor-based system. The workloads of the processor-based systems may be well known such that a fixed power budget can be established and the processor-based systems achieve the desired performance.

However, particularly with AI applications, workloads may greatly vary in processor-based systems in data centers. Not all processor-based systems may need the same amount of power to process a given workload and at a given operating frequency to achieve a desired performance. Some processor-based systems may be executing less intense workloads that can be executed at lower operating frequencies, and thus a lower performance level, under its power budget. Other processor-based systems may be executing workloads that would require additional power outside of its power budget to operate at a higher operating frequency to perform at the desired performance. In addition, there can be sudden changes in the data center power availability, such as uninterruptable power supply (UPS) changes, that can impact power distribution to the processor-based systems and thus the CPU performance in the processor-based systems. These issues can impact the performance level of applications executed by the processor-based systems in the data center. This can then impact user experiences of such applications. Thus, in data centers, power is becoming one of the chief drivers of total cost of ownership.

SUMMARY

Exemplary aspects disclosed herein include processor-based systems employing local dynamic power management based on controlling performance and operating power consumption. Related methods are also disclosed. For example, such processor-based systems may be provided as a system-on-a-chip (SoC). These processor-based systems may be included on a card or blade as a printed circuit board (PCB) in racks in data centers for performing large data intensive workloads and applications. Such data centers include a power supply and distribution system to distribute power to the processor-based systems according to a power budget established for each processor-based system. In exemplary aspects disclosed herein, the processor-based system is configured to locally manage its power consumption by dynamically adjusting the operating frequency and/or operating voltage level of power supplied to the processor-based system. The processor-based system includes a power control circuit that is aware of the overall power budget for the processor-based system. The power budget may have been established for the processor-based system by another power management system, such as in a data center. The control processor in the processor-based system can dynamically increase the operating voltage of the power supplied to the processor-based system and/or the operating frequency if the consumed power is lower than the power budget. The power control circuit can also dynamically decrease the operating frequency and/or the operating voltage of the power supplied to the processor-based system if the consumed power is higher than the power budget. The power consumption by the processor-based system can vary based on a variety of factors including workload and particular applications executed. Thus, the power control circuit can continuously monitor the power consumption of the processor-based system in a closed-loop manner, and adjust the operating frequency and/or the operating voltage of power supplied to the processor-based system to maintain power consumption of its processor-based system within the power budget. In this manner, the processor-based system and its power control circuit can dynamically manage power consumption to achieve the desired trade-off between higher performance and power consumption within the power budget.

The power budget established for the processor-based system can be based on different factors, such as workload, desired performance level, and/or the capacity to supply power to the processor-based system as non-limiting examples. By the processor-based system being able to locally manage its power consumption, this can provide flexibility in managing the overall power consumption of a larger system in which the processor-based system is included, such as a data center. For example, in a data center, some processor-based systems may be executing at higher workload levels that would benefit from higher performance at higher operating frequencies requiring higher power consumption, whereas other processor-based system may be executing lower workload levels that do not require higher power consumption. Reduced power consumption by processor-based systems executing lower workload levels according to a reduced power budget can make additional power available from the available power capacity to processor-based systems executing higher workload levels at an increased power budget to achieve increased overall data center performance. The power control circuit can request a higher power budget if the desired performance level is outside its current power budget, with this additional power being available through a managed reduced performance level power consumption by another processor-based system, for example. The overall power capacity of a data center may have a supply limit. Thus, if the power capacity of the data center was changed or affected, the ability of the processor-based systems to locally manage their power consumption based on their workloads and desired performance may still allow sufficient power distribution for the other processor-based systems in the data center according to their workloads and desired performance level. Thus, the ability of a processor-based system to flexibly and dynamically manage its power can achieve the desired trade-off between performance and power conservation at the processor-based system as well at a data center level in this example.

In aspects disclosed herein, the power control circuit is configured to locally manage power consumption of its processor-based system and is provided as a processor that executes program code (e.g., firmware, software) to monitor power consumption and to dynamically adjust operating frequency and/or operating voltage level. The power control circuit can interface with a separate voltage regulator circuit that manages the voltage level to monitor power consumption and to request operating voltage adjustments. Providing the power control circuit as a processor circuit provides even greater flexibility in the power control circuit locally managing power consumption of its processor-based system. The program code executed by the power control circuit can be programmed and changed as desired depending on design time and operating history characteristics of the processor-based system. Further, operating frequency and voltage parameters that are used to determine voltage levels for corresponding operating frequencies can be adjusted for flexibility and to achieve further efficiency in power consumption for finer tuned control. For example, one processor-based system may have the ability to operate at a given operating frequency at a lower operating voltage than another processor-based system. The power control circuit can also request a higher power budget if the desired performance level is outside its power budget. Further, the power control circuit can be configured and programmed to adjust operating frequency and/or operating voltage levels in a phased, stepwise fashion, as opposed to full adjustments, to reduce a hysteresis (i.e. lag) effect in adjustment of the operating frequency and/or operating voltage levels and the resulting change in power consumption.

In this regard, in one exemplary aspect, a processor-based system configured to receive a power budget to govern its power consumption based on an overall power budget for a plurality of processor-based systems is provided. The processor-based system comprises a power circuit configured to set an operating voltage of a power signal based on a power budget and distribute the power signal on a power output. The processor-based system also comprises a power rail coupled to the power output. The processor-based system also comprises a clock circuit configured to generate a clock signal at an operating frequency on a clock output based on the power budget. The processor-based system also comprises a processing unit comprising at least one compute processor core each coupled to the power rail and the clock output, and each configured to execute program code at a rate based on the operating frequency of the clock signal. The processor-based system also comprises a power control circuit. The power control circuit is configured to determine a current power consumption of the processor-based system based on the at least one compute processor core operating at a current operating frequency of the clock signal and a current operating voltage of the power signal. The power control circuit is configured to determine if the current power consumption by the processor-based is greater than the power budget for the processor-based system. In response to determining the current power consumption is greater than the power budget, the power control circuit is further configured to cause the clock circuit to generate the clock signal at a next operating frequency lower than the current operating frequency and determine if the current operating frequency of the clock signal is at or lower than the next operating frequency. In response to determining the current operating frequency is at or lower than the next operating frequency, the power control circuit is further configured to cause the power circuit to generate the power signal at a next operating voltage lower than the current operating voltage.

In another exemplary aspect, a method of a processor-based system dynamically controlling its performance and operating power consumption based on a power budget for the processor-based system, based on an overall power budget for a plurality of processor-based systems is provided. The method comprises receiving a power budget. The method also comprises setting an operating voltage of a power signal based on the power budget. The method also comprises distributing the power signal at the operating voltage on a power output. The method also comprises generating a clock signal at an operating frequency on a clock output based on the power budget. The method also comprises executing program code at a rate based on the operating frequency of the clock signal in a processing unit comprising at least one compute processor core receiving the power signal. The method also comprises determining a current power consumption of the processor-based system based on the at least one compute processor core operating at a current operating frequency of the clock signal and a current operating voltage of the power signal. The method also comprises determining if the current power consumption by the processor-based system is greater than the power budget for the processor-based system. The method also comprises, in response to determining the current power consumption is greater than the power budget: causing the clock signal to be generated at a next operating frequency lower than the current operating frequency, and determining if the current operating frequency of the clock signal is at or lower than the next operating frequency. The method also comprises, in response to determining the current operating frequency is at or lower than the next operating frequency, causing the power signal to be generated at a next operating voltage lower than the current operating voltage.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 2:
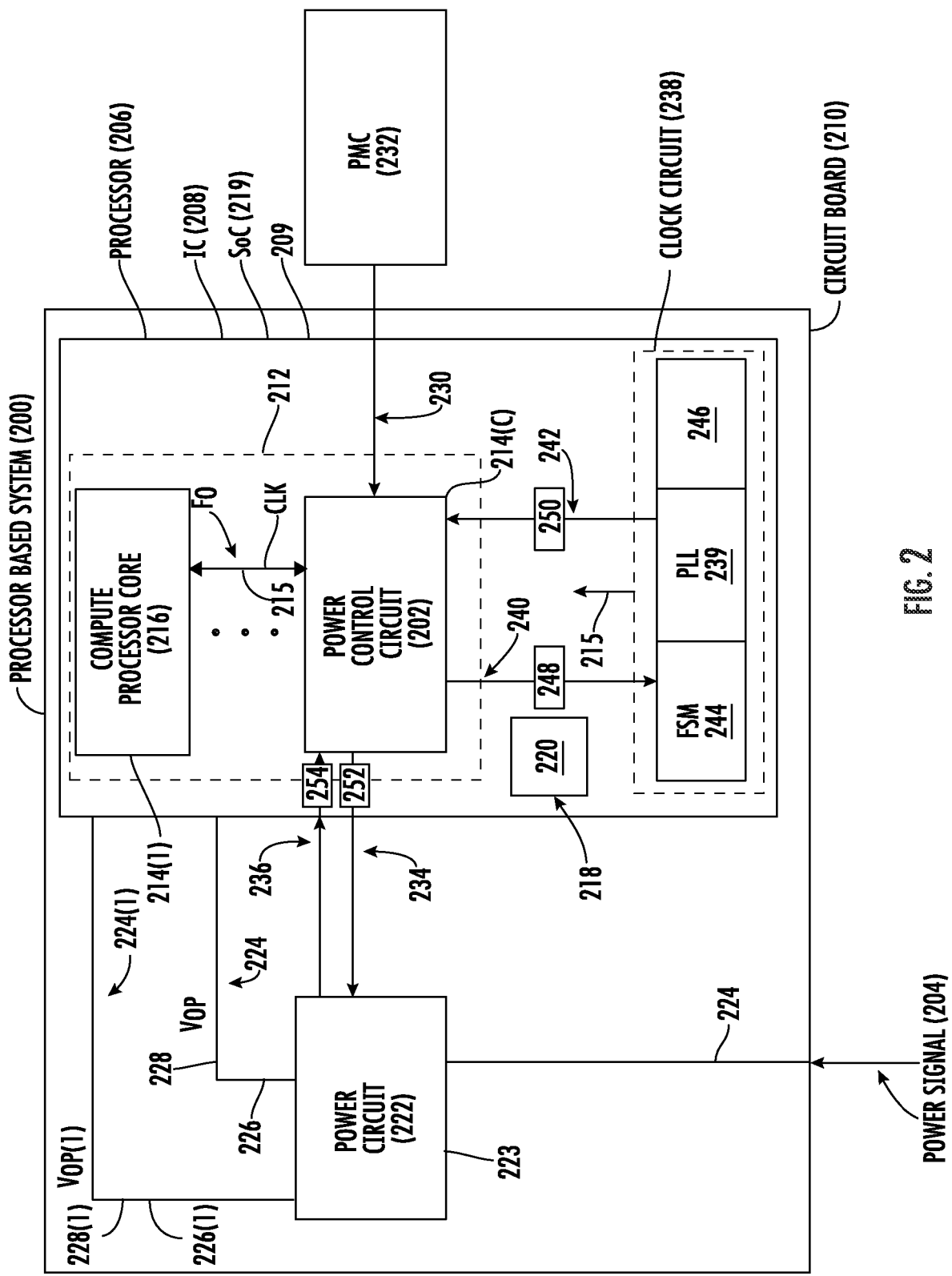
Figure 3:
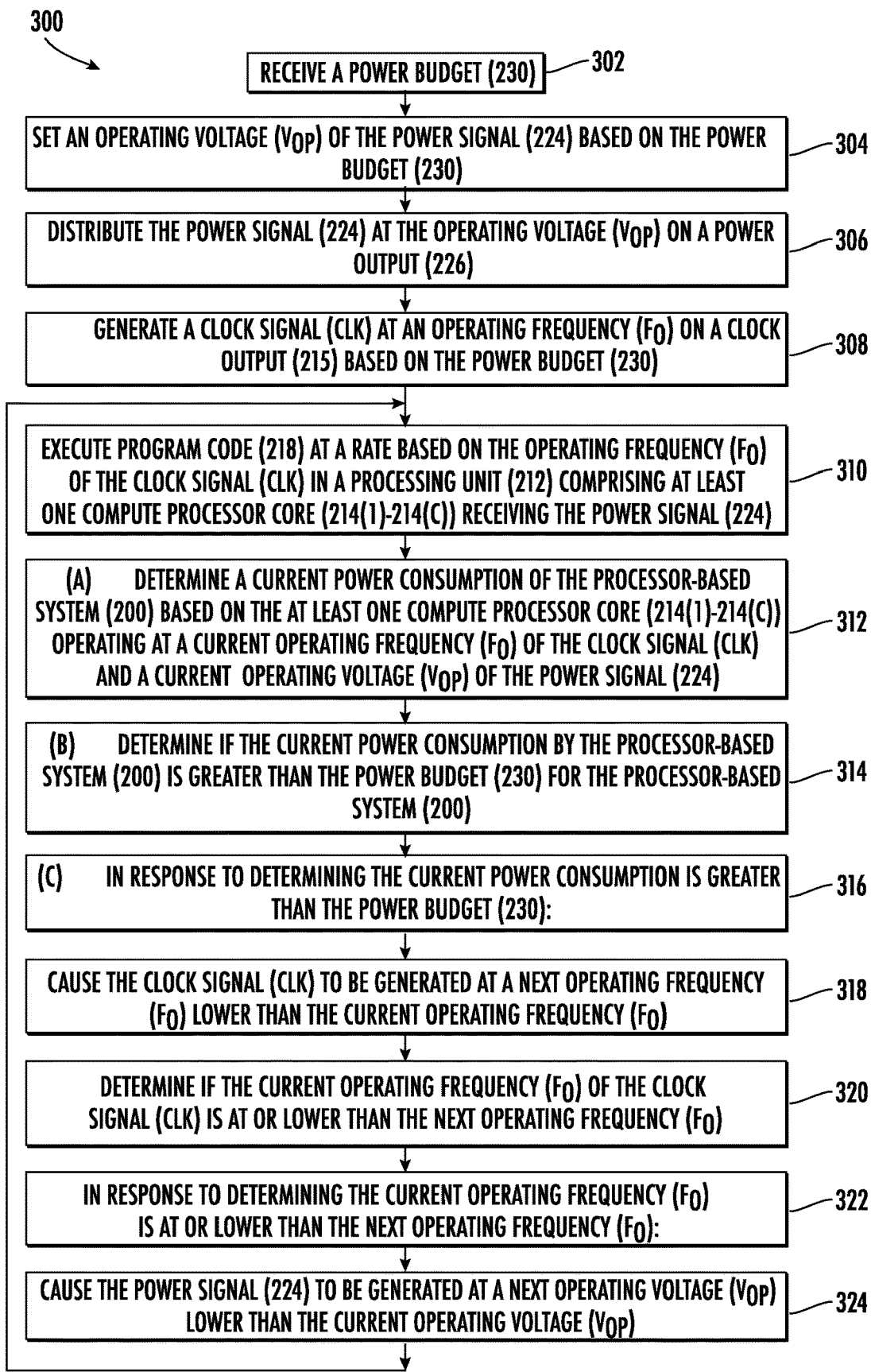
Figure 4:
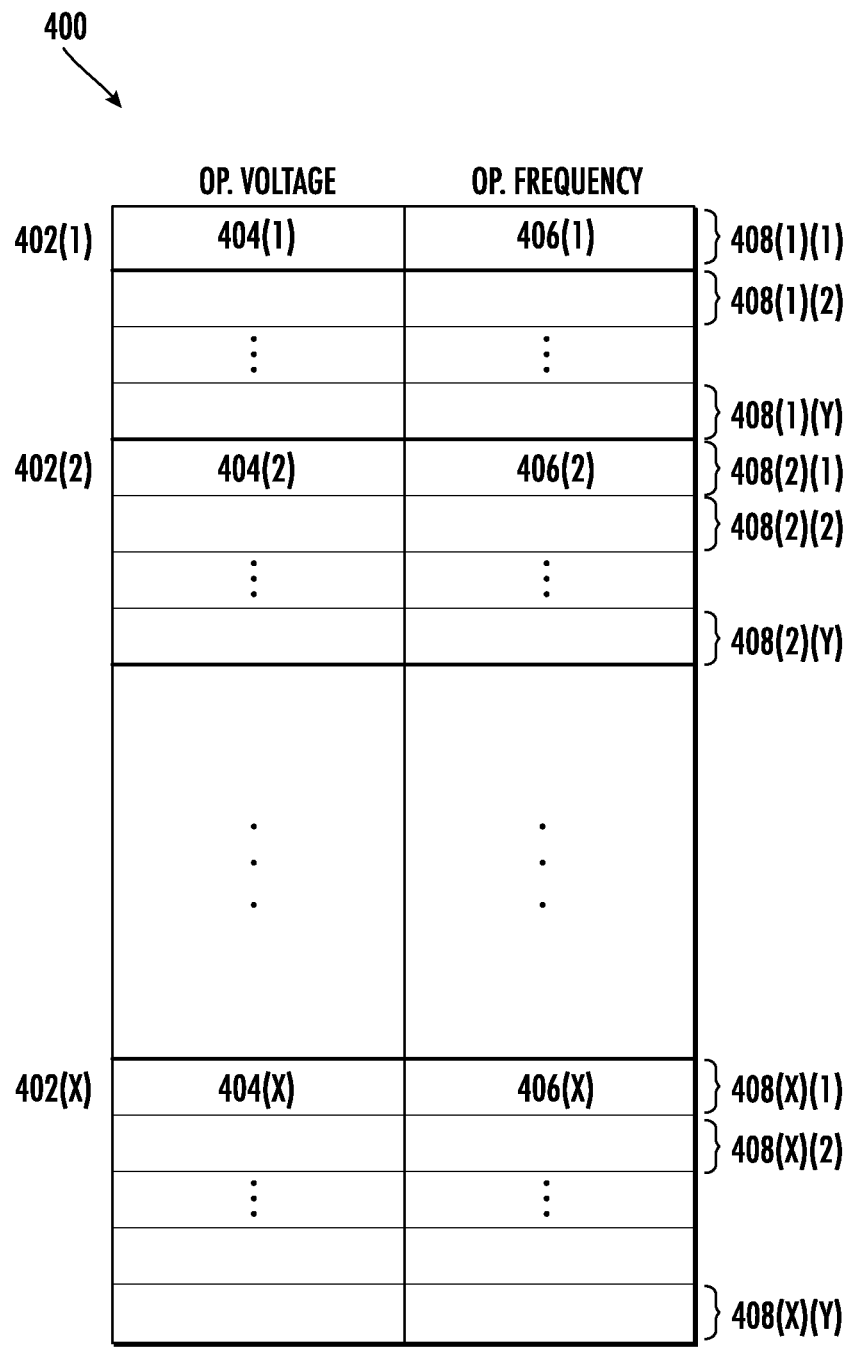
Figure 5:
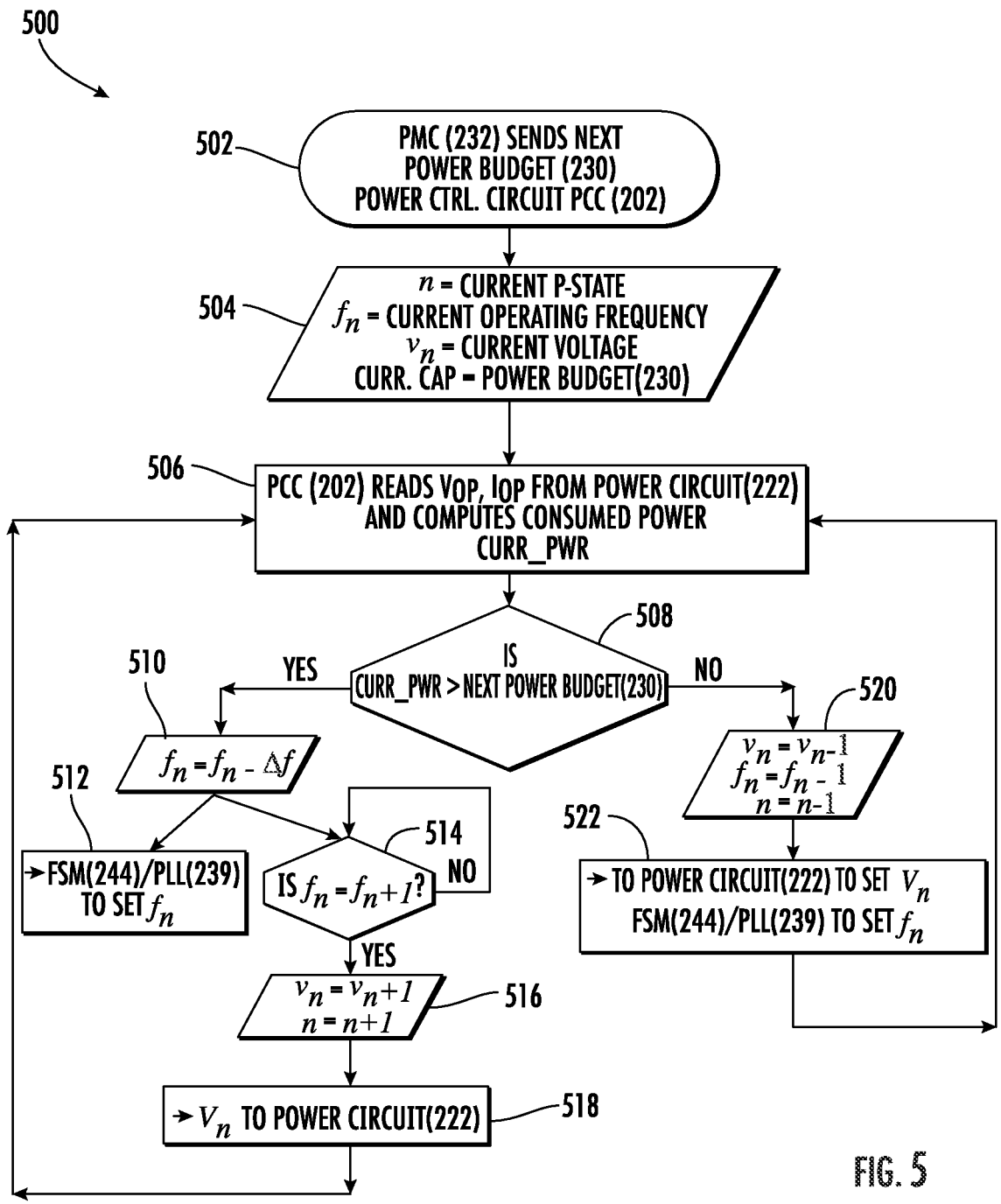
Figure 6:
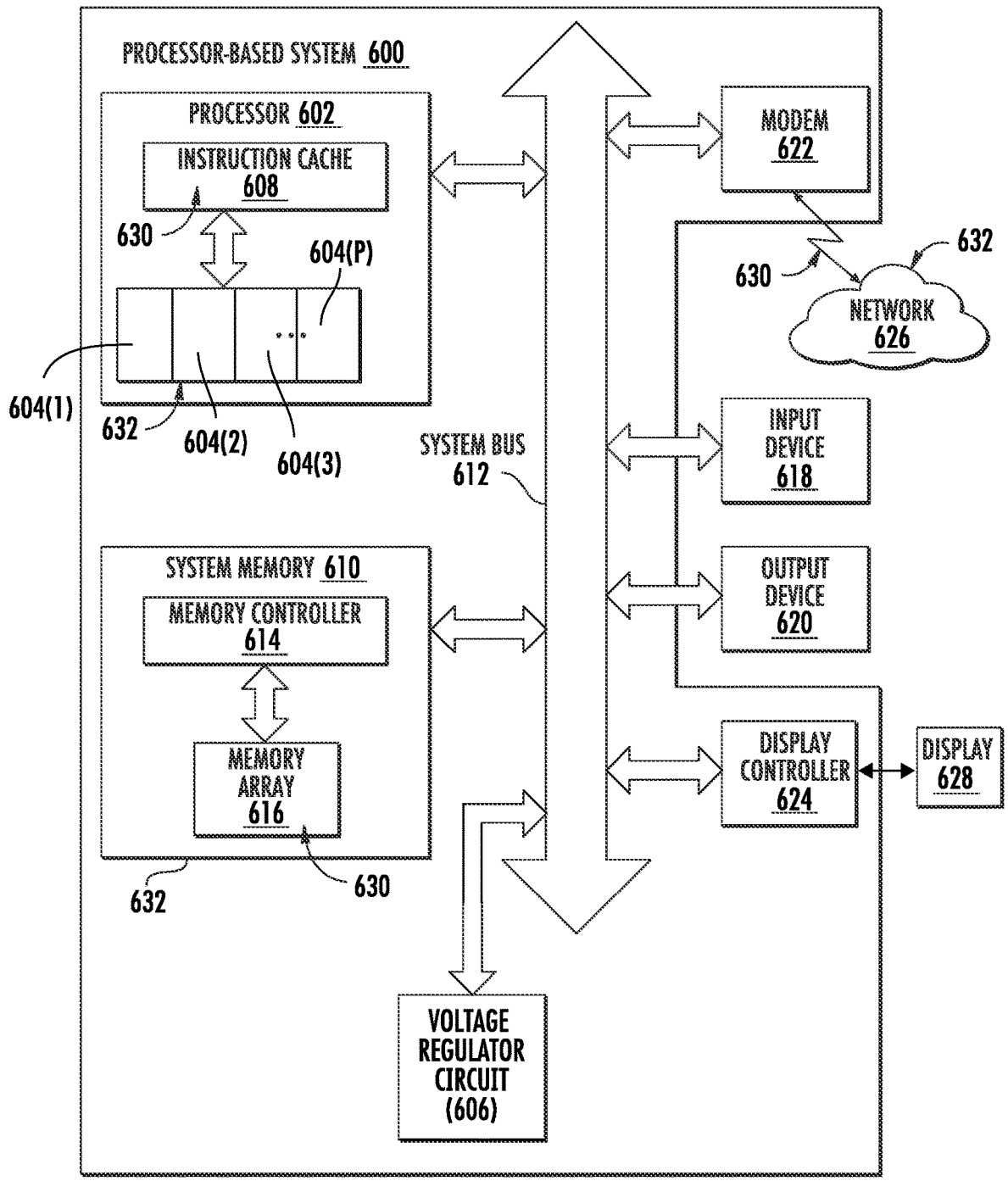

FIG. 2 is a block diagram of an exemplary processor-based system that includes a power control circuit in the exemplary form of a power control processor configured to monitor power consumption of the processor-based system and locally manage power consumption by dynamically adjusting operating frequency and/or operating voltage of power supplied to the processor-based system within an established power budget;

FIG. 3 is a flowchart illustrating an exemplary process of the power control circuit in the processor-based system in FIG. 2 monitoring power consumption of the processor-based system and locally managing power consumption by dynamically adjusting operating frequency and/or operating voltage of power supplied to the processor-based system within an established power budget;

FIG. 4 is an exemplary voltage-frequency table that can be stored in the processor in FIG. 2 and accessible by the power control circuit therein to determine a new operating voltage and corresponding operating frequency as a voltage-frequency pair for controlling power consumption of the processor-based system;

FIG. 5 is a flowchart illustrating a more detailed exemplary process of the power control circuit in the processor-based system in FIG. 2 monitoring power consumption of the processor-based system and locally managing power consumption by dynamically adjusting operating frequency and/or operating voltage of power supplied to the processor-based system within an established power budget; and FIG. 6 is a block diagram of an exemplary processor-based system that includes a processing unit with one or more processor cores each configured to execute computer instructions for execution, wherein one of the processor cores is a power control circuit configured to monitor power consumption of the processor-based system and locally managing power consumption by dynamically adjusting operating frequency and/or operating voltage of power supplied to the processor-based system within an established power budget, including, without limitation, the processor-based system in FIG. 2.

DETAILED DESCRIPTION

Exemplary aspects disclosed herein include processor-based systems employing local dynamic power management based on controlling performance and operating power consumption. Related methods are also disclosed. For example, such processor-based systems may be provided as a system-on-a-chip (SoC). These processor-based systems may be included on a card or blade as a printed circuit board (PCB) in racks in data centers for performing large data intensive workloads and applications. Such data centers include a power supply and distribution system to distribute power to the processor-based systems according to a power budget established for each processor-based system. In exemplary aspects disclosed herein, the processor-based system is configured to locally manage its power consumption by dynamically adjusting the operating frequency and/or operating voltage level of power supplied to the processor-based system. The processor-based system includes a power control circuit that is aware of the overall power budget for the processor-based system. The power budget may have been established for the processor-based system by another power management system, such as in a data center. The control processor in the processor-based system can dynamically increase the operating voltage of the power supplied to the processor-based system and/or the operating frequency if the consumed power is lower than the power budget. The power control circuit can also dynamically decrease the operating frequency and/or the operating voltage of the power supplied to the processor-based system if the consumed power is higher than the power budget. The power consumption by the processor-based system can vary based on a variety of factors including workload and particular applications executed. Thus, the power control circuit can continuously monitor the power consumption of the processor-based system in a closed-loop manner, and adjust the operating frequency and/or the operating voltage of power supplied to the processor-based system to maintain power consumption of its processor-based system within the power budget. In this manner, the processor-based system and its power control circuit can dynamically manage power consumption to achieve the desired trade-off between higher performance and power consumption within the power budget.

The power budget established for the processor-based system can be based on different factors, such as workload, desired performance level, and/or the capacity to supply power to the processor-based system as non-limiting examples. By the processor-based system being able to locally manage its power consumption, this can provide flexibility in managing the overall power consumption of a larger system in which the processor-based system is included, such as a data center. For example, in a data center, some processor-based systems may be executing at higher workload levels that would benefit from higher performance at higher operating frequencies requiring higher power consumption, whereas other processor-based system may be executing lower workload levels that do not require higher power consumption. Reduced power consumption by processor-based systems executing lower workload levels according to a reduced power budget can make additional power available from the available power capacity to processor-based systems executing higher workload levels at an increased power budget to achieve increased overall data center performance. The power control circuit can request a higher power budget if the desired performance level is outside its current power budget, with this additional power being available through a managed reduced performance level power consumption by another processor-based system for example. The overall power capacity of a data center may have a supply limit. Thus, if the power capacity of the data center was changed or affected, the ability of the processor-based systems to locally manage their power consumption based on their workloads and desired performance may still allow sufficient power distribution for the other processor-based systems in the data center according to their workloads and desired performance level. Thus, the ability of a processor-based system to flexibly and dynamically manage its power can achieve the desired trade-off between performance and power conservation at the processor-based system as well at a data center level in this example.

Figure 1A:
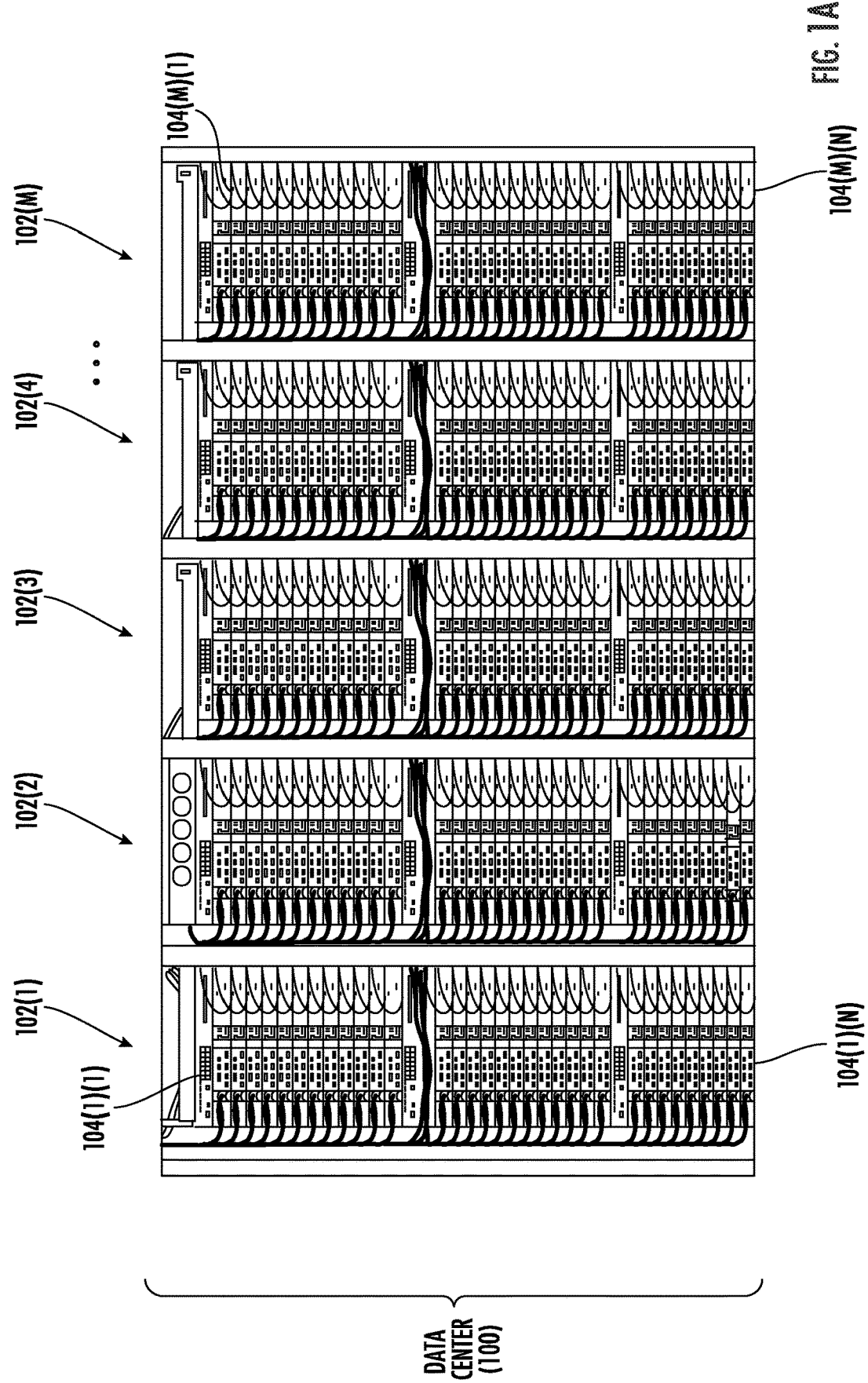
FIG. 1A is diagram of an exemplary data center that includes server racks that include computer systems that each include a processor-based system on a circuit board.
Figure 1B:
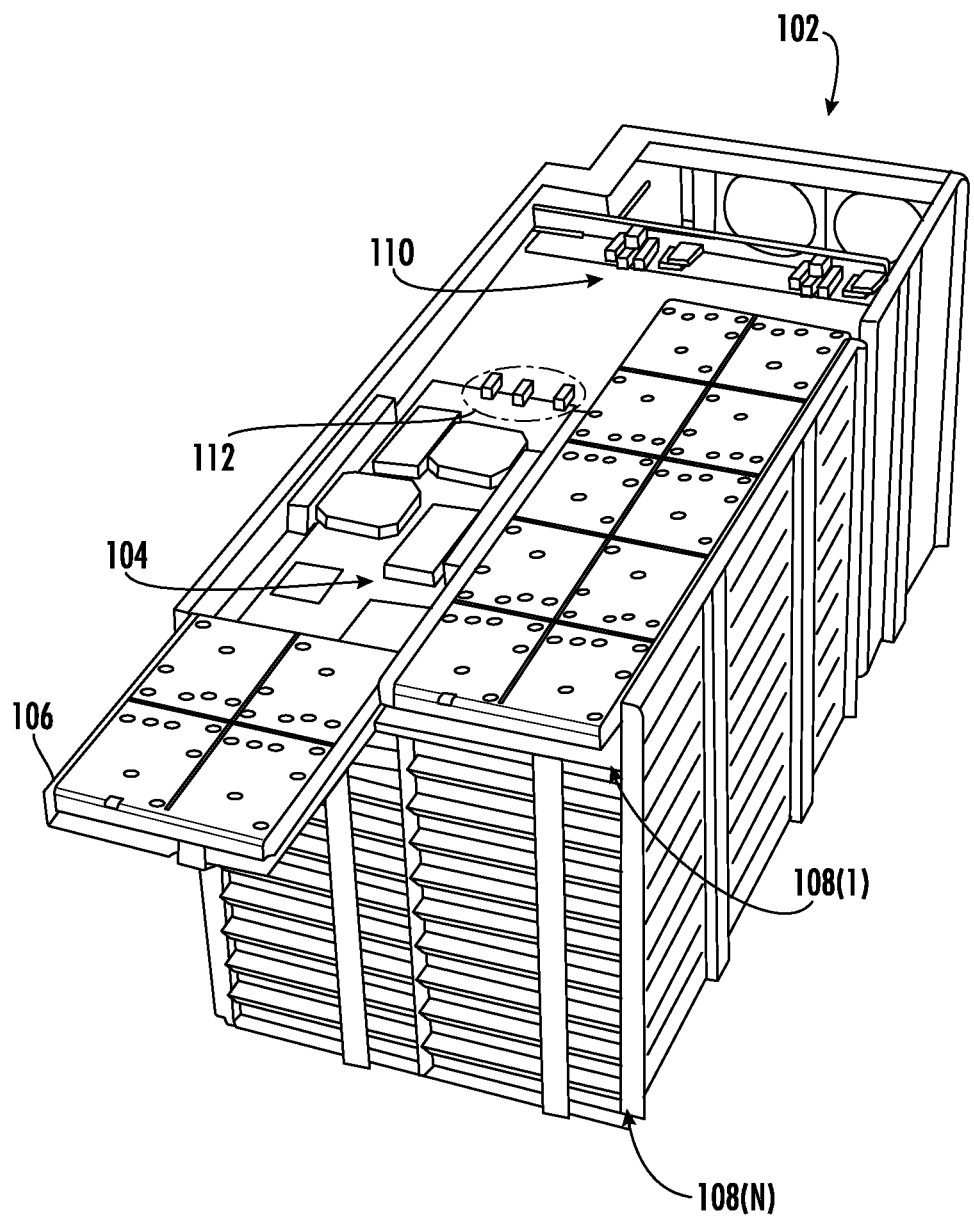
FIG. 1B is a more detailed diagram of an exemplary computer system installed in a server rack that includes a processor-based system mounted on a circuit board and interfaced to a signal and power backplane for external communications and power supply.

In this regard, FIG. 2 is a block diagram of an exemplary processor-based system 200 that includes a power control circuit 202. As discussed in more detail below, the power control circuit 202 is configured to monitor power consumption of the processor-based system 200 and locally manage power consumption of the processor-based system 200. As also discussed in more detail below, the power control circuit 202 is configured to dynamically adjust the operating frequency and/or operating voltage of a power signal 204 supplied to the processor-based system 200 within an established power budget. The processor-based system 200 may be deployed as a board or blade installed in a server or equipment rack in a data center for example, such as the data center 100 in FIGS. 1A and 1B. In FIG. 2, the processor-based system 200 includes a processor 206 that is provided in the form of an integrated circuit (IC) 208 that is mounted to a circuit board 210, such as a PCB. The exemplary components of the processor-based system 200 will now be described. This is followed starting at FIG. 3 by a discussion of exemplary operational aspects of the power control circuit 202 adjusting the operating frequency and/or operating voltage of the power signal 204 supplied to the processor-based system 200 within an established power budget to control power consumption of the processor-based system 200.

With reference to FIG. 2, the processor 206 of the processor-based system includes a processing unit 212 (e.g., a central processing unit (CPU) or general processing unit (GPU)) that can include one or more processor cores 214(1)-214(C). The processor cores 214(1)-214(C) are configured to execute computer program code at a rate of an operating frequency $F_O$ of a clock signal CLK on a clock output 215. For example, the processor core 214(1) is shown as a compute processor core 216 that is configured to execute computer program code 218 ("program code 218") in a memory 220 to perform computations for an application. In this example, one of the processor cores 214(1)-214(C), the processor core 214(C) is the power control circuit 202 that is configured to dynamically adjust the operating frequency and/or operating voltage of the power signal 204 supplied to the processor-based system 200 within an established power budget. The processing unit 212 and memory 220 can be integrated into a single IC chip as a system-on-a-chip (SoC) 219, as an example. As will be discussed in more detail below, providing the power control circuit 202 as a processor circuit can provide flexibility through firmware and/or software execution for the power control circuit 202 to control the power consumption of the processor-based system 200 and for such control to be maintained and/or adjusted as desired.

It may be important to control the power consumption of the processor-based system 200 to ensure that the consumed power does not exceed a power budget. For example, if the processor-based system 200 is deployed in a data center, it may be important to manage the overall power consumption in the data center. However, particularly with AI applications as an example, the workloads assigned to the processor-based system 200 may more greatly vary. And not all processor-based systems in the data center may need the same amount of power to process a given workload at an operating frequency to achieve a desired performance. Some processor-based systems may be executing less intense workloads that can be executed at lower operating frequencies, and thus a lower performance level, under its power budget. Other processor-based systems may be executing workloads that would require additional power outside of its power budget to operate at a higher operating frequency to perform at the desired performance. In addition, there can be sudden changes in the data center power availability, such as uninterruptable power supply (UPS) changes, that can impact power distribution to the processor-based systems and thus the CPU performance in the processor-based systems. These issues can impact the performance level of applications executed by the processor-based systems, such as processor-based system 200, in the data center. This can then impact user experiences of such applications. Thus, in data centers, power is becoming one of the chief drivers of total cost of ownership.

In this regard, with reference to FIG. 2, the processor-based system 200 includes a power circuit 222, which may be a voltage regulator circuit for example. The power circuit 222 may be provided as a separate IC chip 223 from an IC chip 209 that contains the processor 206. The power circuit 222 is coupled to a power rail 228 that receives the power signal 204 to provide power to the processor-based system 200. The power circuit 222 is configured to set an operating voltage $V_{OP}$ on a power signal 224 on a power output 226 of the power rail 228 provided to the processor 206 for operation. The power circuit 222 sets the operating voltage $V_{OP}$ of the power signal 224 based on a power budget established for the processor-based system 200. As discussed in more detail below, the power control circuit 202 of the processor 206 receives a power budget 230 from a power management controller (PMC) 232 that is a separate system from the processor-based system 200 in this example. For example, the PMC 232 may be provided as a centralized system in a data center that provides power budgets to a number of processor-based systems 200, like the processor-based system 200 in FIG. 2, to manage the overall power consumption in a data center. As discussed in more detail below, the power control circuit 202 determines an operating voltage for the processor-based system 200 based on the received power budget 230. The power control circuit 202 then communicates an operating voltage indicator 234 indicating an operating voltage level to the power circuit 222. In response, the power circuit 222 provides the power signal 224 of an operating voltage $V_{OP}$ at the operating voltage level indicated by operating voltage indicator 234 to the processor-based system 202 and its processor 206 for operation. The power circuit 222 can provide an operating voltage feedback indicator 236 indicating an operating voltage level of the operating voltage $V_{OP}$ of the power signal 224 back to the power control circuit 202. The operating voltage level in the operating voltage feedback indicator 236 can be used by the power control circuit 202 to determine the power consumption by the processor-based system 202. The operating voltage level in the operating voltage feedback indicator 236 can also be used to acknowledge that a new operating voltage $V_{OP}$ of the power signal 224 has been achieved for feedback control purposes for the power control circuit 202.

With continuing reference to FIG. 2, the processor 206 also includes a clock circuit 238 configured to generate the clock signal CLK at the operating frequency $F_O$ to clock the processor 206. For example, the clock circuit 238 may include a phase-locked loop (PLL) circuit 239 that is configured to adjust the operating frequency $F_O$ of the clock signal CLK in a closed-loop feedback manner. The clock circuit 238 is configured to generate the clock signal CLK at the operating frequency $F_O$ based on the power budget 230 for the processor-based system 200. In this regard, the power control circuit 202 is configured to determine a desired operating frequency $F_O$ for the clock signal CLK to manage the overall power consumption of the processor-based system 200 based on the received power budget 230. The power control circuit 202 is configured to communicate an operating frequency indicator 240 indicating an operating frequency level to the clock circuit 238 to cause the clock circuit 238 to generate the clock signal CLK at such operating frequency $F_O$. The clock circuit 238 can provide an operating frequency feedback indicator 242 back to the power control circuit 202 to acknowledge the receipt of the operating voltage level and/or the actual operating frequency $F_O$ of the clock signal CLK to the power control circuit 202. For example, as discussed below, the power control circuit 202 may only instruct the power circuit 222 to decrease the operating voltage $V_{OP}$ of the power signal 224 after the operating frequency $F_O$ of the clock signal CLK is decreased when it is desired to reduce power consumption of the processor-based system 200. In this manner, the processor 206 does not operate at an operating frequency based on the operating frequency $F_O$ of the clock signal CLK that is beyond the speed capability of the logic circuits in the processor 206 for a given operating voltage $V_{OP}$ of the power signal 224.

Also, as another example, as discussed above, the power circuit 222 can provide an operating voltage feedback indicator 236 indicating the actual operating voltage $V_{OP}$ of the power signal 224 for feedback control purposes. The power control circuit 202 may only instruct the clock circuit 238 to increase the operating frequency $F_O$ of the clock signal CLK after the operating voltage $V_{OP}$ of the power signal 224 is increased when it is desired to increase power consumption of the processor-based system 200. In this manner, the processor 206 does not operate at an operating frequency based on the operating frequency $F_O$ of the clock signal CLK that is beyond the speed capability of the logic circuits in the processor 206 for a given operating voltage $V_{OP}$ of the power signal 224.

In the example processor 206 in FIG. 2, as discussed in more detail below, the clock circuit 238 includes a finite state machine (FSM) circuit 244. The FSM circuit 244 is configured to control the generation of the clock signal CLK by the PLL circuit 239 at the desired operating frequency according to the operating frequency indicator 240 from the power control circuit 202. The clock circuit 238 in this example includes frequency step circuits 246 that are configured to step up or step down the operating frequency $F_O$ the clock signal CLK in increments. This allows the operating frequency $F_O$ of the clock signal CLK to settle to a new operating frequency over time to control the hysteresis (i.e., lag) effect of the operating frequency $F_O$ of the clock signal CLK when changed. This can be done as opposed to drastically changing the operating frequency $F_O$ of the clock signal CLK to a new operating frequency in a single action or step.

With continuing reference to FIG. 2, one advantage of providing the power control circuit 202 as a processor circuit is that registers can easily be used to provide an interface between the power control circuit 202 and the clock circuit 238. For example, the processor 206 can include an operating frequency register 248 in which the operating frequency indicator 240 can be written by the power control circuit 202 indicating a new operating frequency for the clock signal CLK. The clock circuit 238 can be configured to read the operating frequency register 248 to determine the new operating frequency for the clock signal CLK based on the operating frequency indicator 240. Similarly, the processor 206 can also include an operating frequency feedback register 250 in which the operating frequency feedback indicator 242 can be written by the clock circuit 238 indicating the actual operating frequency of the clock signal CLK. The power control circuit 202 can read the operating frequency feedback register 250 to obtain the operating frequency feedback indicator 242.

Also, the processor 206 can include an operating voltage register 252 in which the operating voltage indicator 234 indicating a new operating voltage level to be set for the operating voltage $V_{OP}$ of the power signal 224 can be written by the power control circuit 202. The power circuit 222 may be configured to read the operating voltage register 252 and/or the processor 206 may be configured to communicate the operating voltage indicator 234 in the operating voltage register 252 to the power circuit 222. Similarly, the processor 206 can also include an operating voltage feedback register 254 in which the operating voltage feedback indicator 236 can be written to communicate to the power control circuit 202. The power control circuit 202 can read the operating voltage feedback indicator 236 from the operating voltage feedback register 250 to obtain the operating voltage feedback indicator 236 indicating the actual operating voltage $V_{OP}$ of the power signal 224. The operating frequency register 248, the operating frequency feedback register 250, the operating voltage register 252, and the operating voltage feedback register 254 can be memory mapped registers to allow the power control circuit 202 to write and read to such registers through memory read and write operations.

Note that the power control circuit 202 in the processor 206 of the processor-based system 200 in FIG. 2 could also be configured to cause the power circuit 222 to adjust power in multiple power domains. For example, the power circuit 222 may be configured to generate the power signal 224 in one voltage domain and a second power signal 224(1) on a second power output 226(1) on a second power rail 228(1) in a different voltage domain to power the processor 206. The processor 206 may have circuits that operate in different voltage domains requiring the separate power signals 224, 224(1) at different respective operating voltages $V_{OP}$, $V_{OP(1)}$. For example, it may be desired to operate the memory 220 of the processor 206 in a different voltage domain than the processor cores 214(1)-214(C-1) in case it is desired for the processor cores 214(1)-214(C-1) to be able to be put in a lower voltage in an idle or sleep mode for example to conserve power. The memory 220 may have a minimum operating voltage necessary to retain data (e.g., like static random access memory (SRAM)) than the processor cores 214(1)-214(C-1) need during lower-power modes.

As discussed in more detail below, the power control circuit 202 is aware of the overall power budget for the processor-based system. The power budget may have been established of the processor-based system by another power management system, such as in a data center. The control processor in the processor-based system can dynamically increase the operating voltage of the power supplied to the processor-based system and/or the operating frequency if the consumed power is lower than the power budget. The power control circuit can also dynamically decrease the operating frequency and/or the operating voltage of the power supplied to the processor-based system if the consumed power is higher than the power budget. The power consumption by the processor-based system can vary based on a variety of factors including workload and particular applications executed. Thus, the power control circuit can continuously monitor the power consumption of the processor-based system in a closed-loop manner, and adjust the operating frequency and/or the operating voltage of power supplied to the processor-based system to maintain power consumption of its processor-based system within the power budget. In this manner, the processor-based system and its power control circuit can dynamically manage power consumption to achieve the desired trade-off between higher performance and power consumption within the power budget.

FIG. 3 is a flowchart illustrating an exemplary process 300 of the power control circuit 202 in the processor-based system in FIG. 2 monitoring power consumption of the processor-based system 200. The process 300 includes the power control circuit 202 locally managing power consumption by dynamically adjusting the operating frequency $F_O$ and/or operating voltage $V_{OP}$ of the power signal 224 supplied to the processor 206 within an established power budget 230. The process 300 in FIG. 3 is described with reference to the processor-based system 200 in FIG. 2.

In this regard, with reference to FIG. 3, the processor-based system 200, and, more particularly, the power control circuit 202 in this example, receives the power budget 230 for power consumption of the processor-based system 200 (block 302 in FIG. 3). As discussed above, the power budget 230 may be received from a separate system outside of the processor-based system 200, such as the PMC 232 in FIG. 2. The power circuit 222 sets an operating voltage $V_{OP}$ of the power signal 224 based on the power budget 230 (block 304 in FIG. 3). As discussed above and below, the power control circuit 202 determines the operating voltage $V_{OP}$ for the power signal 224 based on the power budget 230. The power control circuit 202 communicates the operating voltage indicator 234 indicating the determined operating voltage level for the operating voltage $V_{OP}$ to the power circuit 222. The power circuit 222 distributes the power signal 224 at the set operating voltage $V_{OP}$ on the power output 226 to be received by the processor 206 for powering the processor 206 including the processor cores 214(1)-214(C) (block 306 in FIG. 3). The clock circuit 238 generates the clock signal CLK at an operating frequency $F_O$ on the clock output 215 for clocking the processor 206 based on the power budget 230 (block 308 in FIG. 3). As discussed above and below, the power control circuit 202 determines the operating frequency $F_O$ for the clock signal CLK based on the power budget 230. The power control circuit 202 communicates the operating frequency indicator 240 indicating the determined operating frequency level for the operating frequency $F_O$ to the clock circuit 238. The compute processor cores 214(1)-214(C) in the processor 206 execute program code 218 at a rate based on the set operating frequency $F_O$ of the clock signal CLK being powered by the power signal 224 at the operating voltage $V_{OP}$ distributed by the power circuit 222 (block 310 in FIG. 3).

As discussed above, the power control circuit 202 is configured to determine the power consumption of the processor-based system 200 and determine the operating frequency $F_O$ of the clock signal CLK and/or the operating voltage $V_{OP}$ of the power signal 224 should be adjusted based on the power budget 230. The power control circuit 202 may determine the power consumption of the processor-based system 202 based on the operating voltage level in the operating voltage feedback indicator 236 set by the power circuit 222 as an example. For example, the power budget 230 may be updated. Also, as another example, the previously determined and set operating frequency $F_O$ of the clock signal CLK and/or the operating voltage $V_{OP}$ of the power signal 224 may cause the power consumption of the processor-based system 200 to exceed or be below the power budget 230. Ideally, it is desired for the power consumption of the processor-based system 200 to be at or close to the power budget 230 so that the desired trade-off of processing unit 212 performance versus efficiency in power consumption of the processor-based system 200 is achieved according to the set power budget 230.

In this regard, as shown in FIG. 3, another step in the process 300 is for the power control circuit 202 to determine a current power consumption of the processor-based system 200 based on the compute processor cores 214(1)-214(C) operating at the current operating frequency $F_O$ of the clock signal CLK and at the current operating voltage $V_{OP}$ of the power signal 224 (block 312 in FIG. 3). The power control circuit 202 determines if the current power consumption by the processor-based system 200 is greater than the power budget 230 for the processor-based system 200 (block 314 in FIG. 3). For example, the power budget 230 may have been reduced to allow for increased power consumption and performance by another processor-based system 200 receiving power from the same power distribution network as supplies the power signal 204 to the processor-based system 200. In response to determining the current power consumption is greater than the power budget 230 (block 316 in FIG. 3), the power control circuit causes the clock signal CLK to be generated by the clock circuit 238 at a next operating frequency $F_O$ lower than the current operating frequency $F_O$ of the clock signal CLK (block 318 in FIG. 3). This is because it is desired to first reduce the operating frequency $F_O$ of the clock signal CLK before the operating voltage $V_{OP}$ of the power signal 224 is reduced so that the processor 206 can continue to operate properly. The ability of the processor 206 to operate clocked by the clock signal CLK at a given operating frequency $F_O$ requires a certain minimum voltage for the logic circuits in the processor 206 to operate properly. The power control circuit 202 then determines if the current operating frequency $F_O$ of the clock signal CLK is at or lower than the next operating frequency $F_O$ of the clock signal CLK to determine if the clock signal CLK has settled to the new next operating frequency $F_O$ (block 320 in FIG. 3). In response to determining the current operating frequency $F_O$ of the clock signal CLK is at or lower than the next operating frequency $F_O$ (block 322 in FIG. 3), the power control circuit 202 causes the power circuit 222 to generate the power signal 224 at the determined next operating voltage $V_{OP}$ lower than the current operating voltage $V_{OP}$ (block 324 in FIG. 3).

In this manner, when the power consumption of the processor-based system 200 is to be reduced based on the power budget 230 and its current power consumption, the operating frequency $F_O$ of the clock signal CLK is reduced first before the operating voltage $V_{OP}$ of the power signal 224 is reduced. By reducing the operating frequency $F_O$ of the clock signal CLK and the operating voltage $V_{OP}$ of the power signal 224, the power consumption of the processor-based system 200 is reduced. And the processing unit 212 can continue to operate to execute program code 218 at the new operating frequency $F_O$ of the clock signal CLK and operating voltage $V_{OP}$ of the power signal 224. The power control circuit 202 is configured to repeat blocks 310-324 in FIG. 3 in a continuous fashion to continually monitor power consumption of the processor-based system 200 and adjust the operating frequency $F_O$ of the clock signal CLK and/or operating voltage $V_{OP}$ of the power signal 224, if required, based on if the power consumption is outside (i.e., higher or lower than) the power budget 230.

If however, in block 316 in FIG. 3, the power budget 230 is greater than the current power consumption of the processor-based system 200, the power control circuit 202 is also configured to increase the power consumption of the processor-based system 200 and processor 206 to achieve greater performance. In this scenario, the power budget 230 allows for increased power consumption to achieve greater performance by the processor 206. In this regard, if in block 314 in FIG. 3, the power control circuit 202 determines that the current power consumption by the processor-based system 200 is less than the power budget 230 for the processor-based system 200, the power control circuit 202 can increase power consumption of the processor-based system 200 to achieve greater performance in the processor 206. In this regard, the power control circuit 202 would first cause the power circuit 222 to generate the power signal 224 at a next determined operating voltage $V_{OP}$ higher than the current operating voltage $V_{OP}$. The power control circuit 202 sets the operating voltage $V_{OP}$ of the power signal 224 to the determined next operating voltage $V_{OP}$. This is so the processor 206 can support operation based on the clock signal CLK being at an increased operating frequency $F_O$ for increased performance. The power control circuit 202 then determines if the current operating voltage $V_{OP}$ of the power signal 224 is at or higher than the next operating voltage $V_{OP}$ to ensure that the operating voltage $V_{OP}$ of the power signal 224 has settled to the next operating voltage $V_{OP}$. The power control circuit 202 can then cause the clock circuit 238 to generate the clock signal CLK at a next operating frequency $F_O$ higher than the current operating frequency $F_O$ of the clock signal CLK. Thus, the processor 206 operates based on the new higher operating frequency $F_O$ of the clock signal CLK and higher operating voltage $V_{OP}$ of the power signal 224 for increased performance.

If the power control circuit 202 determines that the current power consumption of the processor-based system 202 is equal or within a defined margin of the power budget 230, the power control circuit 202 can choose to not adjust the operating frequency $F_O$ of the clock signal CLK and/or the operating voltage $V_{OP}$ of the power signal 224. In this regard, the power control circuit 202 would not cause the power circuit 222 to generate the power signal 224 at a different operating voltage. The power control circuit 202 would also not cause the clock circuit 238 to generate the clock signal CLK at a different operating frequency.

The processor 206 can be configured to store a voltage-frequency table that holds voltage-frequency pairs that the power control circuit 202 can use to determine a next operating voltage $V_{OP}$ of the power signal 224 and corresponding next operating frequency $F_O$ of the clock signal CLK to manage power consumption of the processor-based system 200. For example, FIG. 4 illustrates an exemplary voltage-frequency table 400 that can be stored in memory 220 of the processor 206 in FIG. 2 and accessible by the power control circuit 202. The voltage-frequency table 400 contains a plurality of voltage-frequency pair entries 402(1)-402(X) that each contain a voltage level entry 404(1)-404(X) configured to store an operating voltage level and a corresponding frequency level entry 406(1)-406(X) configured to store a corresponding operating frequency level. The voltage-frequency pair entries 402(1)-402(X) are "fused" together to provide complementary operating voltage and operating frequency pairs. The voltage-frequency pair entries 402(1)-402(X) can be based on a performance profile of the processor 206 and processor-based system 200. For example, the voltage-frequency table 400 may contain eight (8) voltage-frequency pair entries 402(1)-402(X). The operating voltage level and corresponding operating frequency levels stored in the voltage-frequency pair entries 402(1)-402(X) may have been determined at design or manufacture of the processor 206 in the processor-based system 200. For example, some processors 206 manufactured according to the same design may have the ability to operate at a higher operating frequency for a given operating voltage than other processors 206 based on manufacturing process variations. By the voltage-frequency table 400 being stored in memory 220, and the power control circuit 202 being configured to access the voltage-frequency table 400 in memory 220, this provides the flexibility of the voltage-frequency pair entries 402(1)-402(X) to be updated at manufacture or even during operation, if desired.

When the power control circuit 202 in the processor-based system 200 in FIG. 2 determines to set a new operating voltage $V_{OP}$ or a new operating frequency $F_O$ for the processor 206, the power control circuit 202 can consult the voltage-frequency table 400. If it is desired to increase the operating frequency $F_O$ of the clock signal CLK when power consumption of the processor-based system 200 is below the power budget 230 for increased performance, the power control circuit 202 can be configured to access the next higher voltage-frequency pair entry 402(1)-402(X) in the voltage-frequency table 400 that has the next higher operating frequency $F_O$. The power control circuit 202 can then access the operating voltage level in the voltage level entry 404(1)-404(X) in the next voltage-frequency pair entry 402(1)-402(X) to obtain the corresponding operating voltage to communicate to the power circuit 222 to increase the operating voltage $V_{OP}$ of the power signal 224. The power control circuit 202 can also access the operating frequency level in the corresponding frequency level entry 406(l)-406(X) in the next voltage-frequency pair entry 402(1)-402(X) to obtain the corresponding operating frequency to communicate to the clock circuit 238 to increase the operating frequency $F_O$ of the clock signal CLK.

Similarly, if it is desired to decrease the operating frequency $F_O$ of the clock signal CLK when power consumption of the processor-based system 200 is above the power budget 230, the power control circuit 202 can be configured to access the next voltage-frequency pair entry 402(1)-402

(X) in the voltage-frequency table 400 that has the next lower operating voltage $V_{OP}$. The power control circuit 202 can then access the operating frequency level in the frequency level entry 406(1)-406(X) in the next lower voltage-frequency pair entry 402(1)-402(X) to obtain the corresponding operating frequency to communicate to the clock circuit 238 to lower the operating frequency $F_O$ of the clock signal CLK. The power control circuit 202 can also access the operating voltage level in the corresponding voltage level entry 404(1)-404(X) in the next voltage-frequency pair entry 402(1)-402(X) to obtain the corresponding operating voltage to communicate to the power circuit 222 to lower the operating voltage $V_{OP}$ of the power signal 224.

Note that the voltage-frequency table 400 could also be directly accessible and/or stored in memory in the clock circuit 238 to be used by the FSM circuit 244 to control the instructions to the PLL circuit 239 to adjust operating frequency $F_O$ of the clock signal CLK. The FSM circuit 244 could access the voltage-frequency table 400 to determine incremental operating frequencies to instructions to the PLL circuit 238 to adjust the operating frequency $F_O$ of the clock signal CLK in a step-wise fashion in intermediate frequency adjustments for example as discussed in more detail below. For example, as shown in FIG. 4, the voltage-frequency table 400 could also include intermediate voltage-frequency pair entries 408(1)(1)-408(1)(Y)-408(X)(1)-408(X)(Y) for each voltage-frequency pair entry 402(1)-402(X) to provide intermediate operating voltage and operating frequency pairs between voltage-frequency pair entries 408(1)(1)-408(1)(Y)-408(X)(1)-408(X)(Y). For example, the power circuit 222 could use the intermediate operating voltage and operating frequency pairs in the intermediate voltage-frequency pair entries 408(1)(1)-408(1)(Y)-408(X)(1)-408(X)(Y) to adjust the operating frequency $F_O$ of the clock signal CLK and the operating voltage $V_{OP}$ of the power signal 224 in a step-wise function in granular steps to mitigate sudden larger adjustments. Each adjustment at a granular step of adjusting the operating frequency $F_O$ of the clock signal CLK could be confirmed by the clock circuit 238 before a next adjustment is made. The clock circuit 238 can make the granular adjustments of the operating frequency $F_O$ of the clock signal CLK based on the intermediate voltage-frequency pair entries 408(1)(1)-408(1)(Y)-408(X)(1)-408(X)(Y). The power control circuit 202 can receive confirmation that the next determined operating frequency $F_O$ of the clock signal CLK has been achieved based on the power budget 230 through the operating frequency feedback indicator 242 from the clock circuit 238.

FIG. 5 is a flowchart illustrating a more detailed exemplary process 500 of the power control circuit 202 in the processor 206 of the processor-based system 200 in FIG. 2 monitoring and locally managing power consumption of the processor-based system 200. For example, as discussed below, the process 500 in FIG. 5 can be used in conjunction with the power circuit 222 and the clock circuit 238 to change the operating frequency $F_O$ of the clock signal CLK based on the FSM circuit 244 controlling the PLL circuit 239 in the clock circuit 238 in FIG. 2 operational power states in a closed-loop manner.

In this regard, as shown in FIG. 5, the PMC 232 sends the new power budget 230 as the next power budget 230 to the power control circuit 202 of the processor 206 (block 502). The power control circuit 202 initializes the power state (P-state) to a current power state (block 504 in FIG. 5). The power control circuit 202 sets an operating frequency fn and an operating voltage Vn to the current operating frequency $F_O$ and the current operating voltage $V_{OP}$, respectively (block 504 in FIG. 5). The current operating frequency $F_O$ and the current operating voltage $V_{OP}$ were previously determined and set and/or maintained by the power control circuit 202 in a previous iteration of the process 500 in FIG. 5. The power control circuit 202 then reads the current power as the operating voltage feedback indicator 236 from the operating voltage feedback register 254 from the power circuit 222 to determine the current power consumed by the processor-based system 200 as the current consumed power (curr_pwr) (block 506 in FIG. 5). Alternatively, the power circuit 222 may provide the current operating voltage $V_{OP}$ and the current Iop consumed to the power circuit 222 which then determines the current consumed power (curr_pwr).

With continuing reference to FIG. 5, the power control circuit 202 next determines if the current consumed power (curr_pwr) exceeds the next power budget 230 (block 508 in FIG. 5). If so, the power control circuit 202 will start the operating frequency translation to set a lower operating frequency $F_O$ of the clock signal CLK to clock the processor 206 as the next operating frequency $F_O$ through communication through the operating frequency register 248 and the operating frequency feedback register 250 to the FSM circuit 244 and PLL circuits 239 of the clock circuit 238. As discussed below, the FSM circuit 244 can be configured to gradually change or change the operating frequency $F_O$ of the clock signal CLK in a stepwise fashion by verifying that each step of the change in operating frequency $F_O$ of the clock signal CLK has taken effect before further changing the operating frequency $F_O$ of the clock signal CLK to reach the final, desired operating frequency $F_O$.

In this regard, as shown in FIG. 5, if the power control circuit 202 determines that the current consumed power (curr_pwr) exceeds the next power budget 230 (block 508 in FIG. 5), the power control circuit 202 determines the next operating frequency (fn) of the clock signal CLK as a lowered operating frequency $F_O$ by a desired change ($\Delta f$) in the operating frequency $F_O$ to reduce power consumption by the processor-based system 200 (block 510 in FIG. 5). For example, as discussed above, the power control circuit 202 may determine the next lower operating frequency $F_O$ from the voltage-frequency table 400. The power control circuit 202 then communicates the determined next operating frequency (fn) to the FSM circuit 244 in the clock circuit 238 in FIG. 2 through the operating frequency register 248 as the operating frequency indicator 240 to cause the clock circuit 238, and more specifically the PLL circuit 239, to set the operating frequency $F_O$ of the clock signal CLK to the next operating frequency (fn) (block 512 in FIG. 5). The power control circuit 202 determines if the operating frequency $F_O$ of the clock signal CLK has been set to the next operating frequency (fn) (block 514 in FIG. 5).

Once the power control circuit 202 determines the operating frequency $F_O$ of the clock signal CLK has been set by the clock circuit 238 to the next operating frequency (fn) (block 514 in FIG. 5), the power control circuit 202 sets the operating voltage $V_{OP}$ for the power signal 224 to power the processor-based system 200 to a lowered operating voltage (Vn+1) as the new operating voltage $V_{OP}$ to reduce power consumption by the processor-based system 200 (block 516 in FIG. 5). As discussed above, the operating frequency $F_O$ of the clock signal CLK can be caused to be lowered by the power control circuit 202 first before the operating voltage $V_{OP}$ of the power signal 224 can be caused to be decreased by the power control circuit 202. For example, as discussed above, the power control circuit 202 may determine the next lower operating voltage $V_{OP}$ from the voltage-frequency table 400 in FIG. 4. For any given operating frequency $F_O$ of the clock signal CLK, the power control circuit 202 can determine a corresponding voltage to set the operating voltage (Vn) in the voltage-frequency table 400 as previously described.

The power control circuit 202 communicates the determined next operating voltage (Vn) to the power circuit 222 in FIG. 2 as the operating voltage indicator 234 through the operating frequency register 252 to cause the power circuit 222 to set the operating voltage $V_{OP}$ of the power signal 224 to the next operating voltage (Vn) (block 518 in FIG. 5).

With reference to FIG. 2, in the example of this process 500 and the processor-based system 200, the FSM circuit 244 is configured to go up and down power states to increase and decrease the operating frequency $F_O$ of the clock signal CLK in response to a change in the next operating frequency (fn) set by the power control circuit 202. In this example, the power control circuit 202 simply indicates to the clock circuit 238 to either step up or step down the operating frequency $F_O$ of the clock signal CLK. The FSM circuit 244 controls the PLL circuit 239 to generate the clock signal CLK at the next operating frequency (fn). The FSM circuit 244 may be programmed to cause the PLL circuit 239 to generate the clock signal CLK at the next operating frequency (fn) in incremental steps after a next incremental change in the operating frequency $F_O$ of the clock signal CLK is verified in a closed loop manner. The FSM circuit 244 may be configured to instruct the PLL circuit 239 to change the operating frequency $F_O$ of the clock signal CLK according to a proportional-integral-derivative (PID) algorithm, where the operating frequency $F_O$ of the clock signal CLK, a rate of change of the operating frequency $F_O$ of the clock signal CLK, and/or an integration of a previous history of operating frequencies $F_O$ of the clock signal CLK is used to determine the next incremental operating frequency $F_O$ for the clock signal CLK. For example, previous set operating frequencies $F_O$ of the clock signal CLK may be stored by the FSM 239 in the clock circuit 238. The clock circuit 238 can be configured to cause the operating frequency $F_O$ of the clock signal CLK to be adjusted iteratively until the operating frequency $F_O$ of the clock signal CLK reaches the desired next operating frequency (fn) set by the power control circuit 202. The clock circuit 238 can communicate the current operating frequency $F_O$ of the clock signal CLK as the operating frequency feedback indicator 242 in the operating frequency feedback register 250 to be read by the power control circuit 202. The clock circuit 238 can communicate the current operating frequency $F_O$ of the clock signal CLK as the operating frequency feedback indicator 242 in the operating frequency feedback register 250 on an ongoing basis or once the current operating frequency $F_O$ of the clock signal CLK reaches the next operating frequency (fn) as set by the PLL circuit 239.

With reference back to FIG. 5, if the power control circuit 202 determines that the current consumed power (curr_pwr) does not exceed the next power budget 230 (block 508 in FIG. 5), the operating frequency $F_O$ of the clock signal CLK and/or the operating voltage $V_{OP}$ of the power signal 224 may be increased to achieve greater performance by the processor-based system 200 and the processor 206 as previously discussed. In this regard the power control circuit 202 sets the next operating voltage $V_{OP}$ for the power signal 224 to power the processor-based system 200 to an increased operating voltage (Vn-1) as the new operating voltage $V_{OP}$ to increase power consumed by the processor-based system 200 (block 520 in FIG. 5). As discussed above, the operating voltage $V_{OP}$ of the power signal 224 can be caused to be increased by the power control circuit 202 first before causing the operating frequency $F_O$ of the clock signal CLK to be increased. The power control circuit 202 sets the next in the operating frequency $F_O$ the clock signal CLK as an increased operating frequency $F_O$ by a desired change (fn–1) which increases performance of and power consumption by the processor-based system 200 (block 520 in FIG. 5). For example, as discussed above, the power control circuit 202 may determine the next increased operating voltage $V_{OP}$ and operating frequency $F_O$ from the voltage-frequency table 400 in FIG. 4. For any given operating frequency $F_O$ of the clock signal CLK, the power control circuit 202 can determine a corresponding voltage to set the operating voltage (Vn) in the voltage-frequency table 400 as previously described. The power control circuit 202 communicates the determined next operating voltage (Vn) to the power circuit 222 in FIG. 2 as the operating voltage indicator 234 through the operating frequency register 252 to cause the power circuit 222 to set the operating voltage $V_{OP}$ of the power signal 224 to the next operating voltage (Vn) (block 522 in FIG. 5).

After the operating voltage $V_{OP}$ of the power signal 224 is confirmed by the power control circuit 202 through the operating voltage feedback register 254, the power control circuit 202 then communicates the determined next operating frequency (fn) to the FSM circuit 244 in the clock circuit 238 in FIG. 2 through the operating frequency register 248 as the operating frequency indicator 240 to cause the clock circuit 238, and more specifically the PLL circuit 239, to set the operating frequency $F_O$ of the clock signal CLK to the increased next operating frequency (fn) (block 522 in FIG. 5).

As previously discussed, the FSM circuit 244 is configured to go up and down power states to increase and decrease, respectively, the operating frequency $F_O$ of the clock signal CLK in response to a change in the next operating frequency (fn) set by the power control circuit 202. The FSM circuit 244 controls the PLL circuit 239 to generate the clock signal CLK at the next operating frequency (fn). The FSM circuit 244 may be programmed to cause the PLL circuit 239 to generate the clock signal CLK at the next operating frequency (fn) in incremental steps after a next incremental change in the operating frequency $F_O$ of the clock signal CLK is verified in a closed-loop manner. The FSM circuit 244 may be configured to instruct the PLL circuit 239 to increase the operating frequency $F_O$ of the clock signal CLK according to a PID algorithm, where the operating frequency $F_O$ of the clock signal CLK, a rate of change of the operating frequency $F_O$ of the clock signal CLK, and/or an integration of a previous history of operating frequencies $F_O$ of the clock signal CLK is used to determine the next incremental operating frequency $F_O$ for the clock signal CLK. The clock circuit 238 can be configured to cause the operating frequency $F_O$ of the clock signal CLK to be adjusted iteratively until the operating frequency $F_O$ of the clock signal CLK reaches the desired next operating frequency (fn) set by the power control circuit 202. The clock circuit 238 can communicate the current operating frequency $F_O$ of the clock signal CLK as the operating frequency feedback indicator 242 in the operating frequency feedback register 250 to be read by the power control circuit 202. The clock circuit 238 can communicate the current operating frequency $F_O$ of the clock signal CLK as the operating frequency feedback indicator 242 in the operating frequency feedback register 250 on an ongoing basis or once the current operating frequency $F_O$ of the clock signal CLK reaches the next operating frequency (fn) as set by the PLL circuit 239. The process 500 then repeats back to block 506 in FIG. 5 in a looping, iterative fashion to continually and dynamically determine and adjust the operating frequency $F_O$ of the clock signal CLK and/or the operating voltage $V_{OP}$ of the power signal 224 to control power consumption of the processor-based system 200 within the power budget 230.

Note that the power control circuit 202 described above in the processor 206 of the processor-based system 200 in FIG. 2 could also be configured to cause the power circuit 222 to adjust power in multiple power domains. For example, the power circuit 222 may be configured to generate a second power signal 224(1) in a different voltage domain than the power signal 224 to power the processor 206. For example, the processor 206 may have circuits that operate in different voltage domains based on the power signals 224, 224(0.1). For example, it may be desired to operate the memory 220 of the processor 206 in a different voltage domain than the processor cores 214(1)-214(C-1) in case it is desired for the processor cores 214(1)-214(C-1) to be able to be put in a lower voltage in an idle or sleep mode, for example. The memory 220 may have a minimum operating voltage necessary to retain data (e.g., like SRAM) than the processor cores 214(1)-214(C-1) need during lower-power modes.

FIG. 6 is a block diagram of an exemplary processor-based system 600 configured to employ local dynamic power management of the processor-based system 600 based on controlling performance and operating power consumption, and related methods. The processor-based system 600 includes a processor 602 that can be configured to perform local dynamic power management based on controlling performance and operating power consumption. In this example, the processor 602 includes one or more CPU cores 604(1)-604(P). For example, one of the CPU cores 604(P) can be a power control circuit, like the power control circuit 202 in FIG. 2, to perform local dynamic power management of the processor-based system 600 based on controlling performance and operating power consumption. The power control circuit 604(P) is configured to interface with a voltage regulator circuit 606 that is configured to set the voltage level of power provided to the processor-based system 600 for operation. The processor 602 can include, without limitation, the processor 206 in FIG. 2 and any of the functionality for performing dynamic power management described above and in FIGS. 3-4.

The processor-based system 600 may be a circuit or circuits included in an electronic board card, such as, a PCB, a server, a personal computer, a desktop computer, a laptop computer, a personal digital assistant (PDA), a computing pad, a mobile device, or any other device, and may represent, for example, a server or a user's computer. The processor 602 represents one or more general-purpose processing circuits, such as a microprocessor, central processing unit, or the like. The processor 602 is configured to execute processing logic in computer instructions for performing the operations and steps discussed herein. The processor 602 also includes an instruction cache 608 for temporary, fast access memory storage of instructions. Fetched or prefetched instructions from a memory, such as from a system memory 610 over a system bus 612, are stored in the instruction cache 608.

The processor 602 and the system memory 610 are coupled to the system bus 612 and can intercouple peripheral devices included in the processor-based system 600. As is well known, the processor 602 communicates with these other devices by exchanging address, control, and data information over the system bus 612. For example, the processor 602 can communicate bus transaction requests to a memory controller 614 in the system memory 610 as an example of a slave device. Although not illustrated in FIG. 6, multiple system buses 612 could be provided, wherein each system bus constitutes a different fabric. In this example, the memory controller 614 is configured to provide memory access requests to a memory array 616 in the system memory 610. The memory array 616 is comprised of an array of storage bit cells for storing data. The system memory 610 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices can be connected to the system bus 612. As illustrated in FIG. 6, these devices can include the system memory 610, one or more input device(s) 618, one or more output device(s) 620, a modem 622, and one or more display controllers 624, as examples. The input device(s) 618 can include any type of input device, including, but not limited to, input keys, switches, voice processors, etc. The output device(s) 620 can include any type of output device, including, but not limited to, audio, video, other visual indicators, etc. The modem 622 can be any device configured to allow exchange of data to and from a network 626. The network 626 can be any type of network, including, but not limited to, a wired or wireless network, a private or public network, a local area network (LAN), a wireless local area network (WLAN), a wide area network (WAN), a BLUETOOTH™ network, and the Internet. The modem 622 can be configured to support any type of communications protocol desired. The processor 602 may also be configured to access the display controller(s) 624 over the system bus 612 to control information sent to one or more displays 628. The display(s) 628 can include any type of display, including, but not limited to, a cathode ray tube (CRT), a liquid crystal display (LCD), a plasma display, etc.

The processor-based system 600 in FIG. 6 may include a set of instructions 630 that may include conditional control instructions that cause such instructions to either be CI instructions or CD instructions. The instructions 630 may be stored in the system memory 610, processor 602, and/or instruction cache 608 as examples of non-transitory computer-readable medium 632. The instructions 630 may also reside, completely or at least partially, within the system memory 610 and/or within the processor 602 during their execution. The instructions 630 may further be transmitted or received over the network 626 via the modem 622, such that the network 626 includes the non-transitory computer-readable medium 632.

While the non-transitory computer-readable medium 632 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory (RAM), a magnetic disk storage medium, an optical storage medium, flash memory devices, etc.) and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories, registers, or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium, and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be referenced throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations, and variations of the disclosed embodiments incorporating the spirit and substance of the invention may occur to persons skilled in the art, the invention should be construed to include everything within the scope of the appended claims and their equivalents.

What is claimed is:

1. A processor-based system configured to receive a power budget to govern its power consumption based on an overall power budget for a plurality of processor-based systems, the processor-based system comprising:

a power circuit configured to set an operating voltage of a power signal based on a power budget and distribute the power signal on a power output;
a power rail coupled to the power output;
a clock circuit configured to generate a clock signal at an operating frequency on a clock output based on the power budget; and
a processing unit comprising at least one compute processor core each coupled to the power rail and the clock output, and each configured to execute program code at a rate based on the operating frequency of the clock signal; and
a power control circuit configured to:
  (a) determine a current power consumption of the processor-based system based on the at least one compute processor core operating at a current operating frequency of the clock signal and a current operating voltage of the power signal;
  (b) determine if the current power consumption by the processor-based system is greater than the power budget for the processor-based system; and
  (c) in response to determining the current power consumption is greater than the power budget:
    cause the clock circuit to generate the clock signal at a next operating frequency lower than the current operating frequency;
    determine if the current operating frequency of the clock signal is at or lower than the next operating frequency; and
    in response to determining the current operating frequency is at or lower than the next operating frequency:
      cause the power circuit to generate the power signal at a next operating voltage lower than the current operating voltage.

2. The processor-based system of claim 1, wherein the power control circuit is further configured to:
determine if the current power consumption by the processor-based system is less than the power budget for the processor-based system; and
in response to determining the current power consumption is less than the power budget:
  cause the power circuit to generate the power signal at a next operating voltage higher than the current operating voltage;
  determine if the current operating voltage of the power signal is at or higher than the next operating voltage; and
  in response to determining the current operating voltage is at or higher than the than the next operating voltage:
    cause the clock circuit to generate the clock signal at a next operating frequency higher than the current operating frequency; and
  the power control circuit configured to set the operating voltage of the power signal at the next operating voltage.

3. The processor-based system of claim 1, wherein the power control circuit is further configured to:
determine if the current power consumption by the processor-based system is equal to the power budget for the processor-based system; and
in response to determining the current power consumption is equal to the power budget:
  not cause the power circuit to generate the power signal at a next operating voltage different from current operating voltage; and
  not cause the clock circuit to generate the clock signal at a next operating frequency different from the current operating frequency.

4. The processor-based system of claim 1, wherein the power control circuit is configured to repeat steps (a)-(c).

5. The processor-based system of claim 1, wherein the power control circuit comprises a power control processor configured to execute program code to perform steps (a)-(c).

6. The processor-based system of claim 1, further comprising a memory comprising a voltage-frequency table comprising a plurality of voltage-frequency pair entries each comprising a voltage level entry configured to store an operating voltage level and a frequency level entry configured to store a corresponding operating frequency level for the operating voltage level.

7. The processor-based system of claim 6, wherein the power control circuit further configured to:
in response to determining the current power consumption is greater than the power budget:
  access the frequency level entry in a voltage-frequency pair entry among the plurality of voltage-frequency pair entries in the voltage-frequency table corresponding to the current operating frequency;
  set the next operating frequency to the operating frequency level in the frequency level entry of a next voltage-frequency pair entry among the plurality of voltage-frequency pair entries in the voltage-frequency table having a next lower operating frequency level from the current operating frequency; and
  in response to determining the current operating frequency is at or lower than the than the next operating frequency:
    set the next operating voltage to the operating voltage level in the voltage level entry of the next voltage-frequency pair entry.

8. The processor-based system of claim 6, wherein the power control circuit is further configured to:
determine if the current power consumption by the processor-based system is less than the power budget for the processor-based system; and
in response to determining the current power consumption is less than the power budget:
  access the voltage level entry in a voltage-frequency pair entry among the plurality of voltage-frequency pair entries in the voltage-frequency table corresponding to the current operating voltage;
  set the next operating voltage to the operating voltage level in the voltage level entry of a next voltage-frequency pair entry among the plurality of voltage-frequency pair entries in the voltage-frequency table having a next higher operating voltage level from the current operating voltage; and
  cause the power circuit to generate the power signal at the next operating voltage;
  determine if the current operating voltage of the power signal is at or higher than the next operating voltage; and
  in response to determining the current operating voltage is at or higher than the than the next operating voltage:
    set the next operating frequency to the operating frequency level in the operating frequency entry of the next voltage-frequency pair entry; and
    cause the clock circuit to generate the clock signal at the next operating frequency.

9. The processor-based system of claim 7, wherein the power control circuit further configured to change the operating voltage level in voltage level entry and the operating frequency level in the frequency level entry of a voltage-frequency pair entry among the plurality of voltage-frequency pair entries.

10. The processor-based system of claim 1, wherein:
the power control circuit is configured to cause the clock circuit to generate the clock signal at the next operating frequency lower than the current operating frequency, by being configured to:
communicate a frequency change request comprising the next operating frequency lower to the clock circuit; and
the clock circuit is further configured to:
receive the frequency change request from the power control circuit;
(d) generate the clock signal on the clock output at a next intermediate operating frequency between the current operating frequency and the next operating frequency; and
(e) verify the clock signal at the next intermediate operating frequency;
(f) in response to verifying the clock signal at the next intermediate operating frequency, repeat steps (d)-(e) one or more times until the next intermediate operating frequency is the next operating frequency;
generate the clock signal on the clock output at the next operating frequency; and
communicate a voltage change request comprising the next operating voltage lower to the power circuit; and
the power circuit is further configured to:
receive the voltage change request from the power control circuit; and
set the operating voltage of the power signal at the next operating voltage.

11. The processor-based system of claim 1, wherein:
the power control circuit is configured to cause the power circuit to generate the power signal at the next operating voltage, by being configured to:
communicate a voltage change request comprising the next operating voltage lower to the power circuit;
the power circuit is further configured to:
receive the voltage change request from the power control circuit; and
set the operating voltage of the power signal at the next operating voltage; and
communicate an operating voltage change confirmation to the power control circuit when the operating voltage of the power signal is at the next operating voltage;
the power control circuit is further configured to receive the operating voltage change confirmation from the power circuit;
the clock circuit is further configured to:
receive a frequency change request from the power control circuit; and
in response to receiving the frequency change request and the operating voltage change confirmation:
(d) generate the clock signal on the clock output at a next intermediate operating frequency between the current operating frequency and the next operating frequency; and
(e) verify the clock signal at the next intermediate operating frequency;
(f) in response verifying the clock signal at the next intermediate operating frequency, repeat steps (d)-(e) one or more times until the next intermediate operating frequency is the next operating frequency; and
generate the clock signal on the clock output at the next operating frequency.

12. The processor-based system of claim 1, wherein the power control circuit is further configured to, in response to determining the current power consumption is greater than the power budget:
store the current operating frequency in an operating frequency history table in a memory;
determine the next operating frequency by being configured to:
determine the current operating frequency;
determine one or more previous current operating frequencies stored in the operating frequency history table;
determine a rate of change in the current operating frequency; and
determine the next operating frequency based on the current operating frequency, the rate of change in the current operating frequency, and the one or more previous current operating frequencies stored in the operating frequency history table.

13. The processor-based system of claim 1, wherein the clock circuit comprises a phase-locked loop (PLL) circuit.

14. The processor-based system of claim 1, further comprising:
an operating frequency register;
the power control circuit is configured to cause the clock circuit to generate the clock signal at a next operating frequency higher than the current operating frequency by being configured to:
write an operating frequency indicator representing the next operating frequency in the operating frequency register; and
communicate a frequency change request comprising the next operating frequency lower than the current operating frequency to the clock circuit; and
the clock circuit is further configured to:
receive the frequency change request from the power control circuit;
access the operating frequency indicator in the operating frequency register; and
generate the clock signal on the clock output at the next operating frequency indicated by the accessed operating frequency indicator.

15. The processor-based system of claim 1, wherein the power circuit comprises a voltage regulator circuit.

16. The processor-based system of claim 1, wherein:
the power control circuit is configured to cause the power circuit to generate the power signal at the next operating voltage, by being configured to:
communicate a voltage change request comprising the next operating voltage lower to the power circuit; and
the power circuit is further configured to:
receive the voltage change request from the power control circuit; and
set the operating voltage of the power signal at the next operating voltage; and
communicate an operating voltage change confirmation to the power control circuit when the operating voltage of the power signal is at the next operating voltage.

17. The processor-based system of claim 1, wherein the power circuit is configured to receive the power budget from another system separate from the processor-based system.

18. The processor-based system of claim 1, comprising:
a first integrated circuit (IC) chip comprising the power rail, the clock circuit, the processing unit, and the power control circuit; and
a second IC chip comprising the power circuit.

19. The processor-based system of claim 18, wherein the first IC chip comprises a semiconductor die comprising the power rail, the clock circuit, the processing unit, and the power control circuit.

20. The processor-based system of claim 1, wherein:
the power circuit is configured to set a second operating voltage of a second power signal and distribute the second power signal on a second power output;
a second power rail coupled to the second power output; and
the power control circuit is further configured to, in response to determining the current operating frequency is at or lower than the next operating frequency:
cause the power circuit to generate the second power signal at the second operating voltage lower than the current operating voltage.

21. A method of a processor-based system dynamically controlling its performance and operating power consumption based on a power budget for the processor-based system, based on an overall power budget for a plurality of processor-based systems, comprising:
receiving a power budget;
setting an operating voltage of a power signal based on the power budget;
distributing the power signal at the operating voltage on a power output;
generating a clock signal at an operating frequency on a clock output based on the power budget; and
executing program code at a rate based on the operating frequency of the clock signal in a processing unit comprising at least one compute processor core receiving the power signal;
(a) determining a current power consumption of the processor-based system based on the at least one compute processor core operating at a current operating frequency of the clock signal and a current operating voltage of the power signal;
(b) determining if the current power consumption by the processor-based system is greater than the power budget for the processor-based system; and (c) in response to determining the current power consumption is greater than the power budget:
causing the clock signal to be generated at a next operating frequency lower than the current operating frequency;
determining if the current operating frequency of the clock signal is at or lower than the next operating frequency; and
in response to determining the current operating frequency is at or lower than the next operating frequency:
causing the power signal to be generated at a next operating voltage lower than the current operating voltage.

22. The method of claim 21, further comprising:
determining if the current power consumption by the processor-based system is less than the power budget for the processor-based system; and
in response to determining the current power consumption is less than the power budget:
causing a power circuit to generate the power signal at a next operating voltage higher than the current operating voltage;
determining if the current operating voltage of the power signal is at or higher than the next operating voltage; and
in response to determining the current operating voltage is at or higher than the than the next operating voltage:
causing the clock circuit to generate the clock signal at a next operating frequency higher than the current operating frequency; and
generating the power signal at the next operating voltage higher than the current operating voltage.

23. The method of claim 21, further comprising:
determining if the current power consumption by the processor-based system is equal to the power budget for the processor-based system; and
in response to determining the current power consumption is equal to the power budget:
not generating the power signal at a next operating voltage different from the current operating voltage; and
not generating the clock signal at a next operating frequency different from the current operating frequency.

24. The method of claim 21, further comprising repeating steps (a)-(c).

* * * * *